Patented Apr. 6, 1937

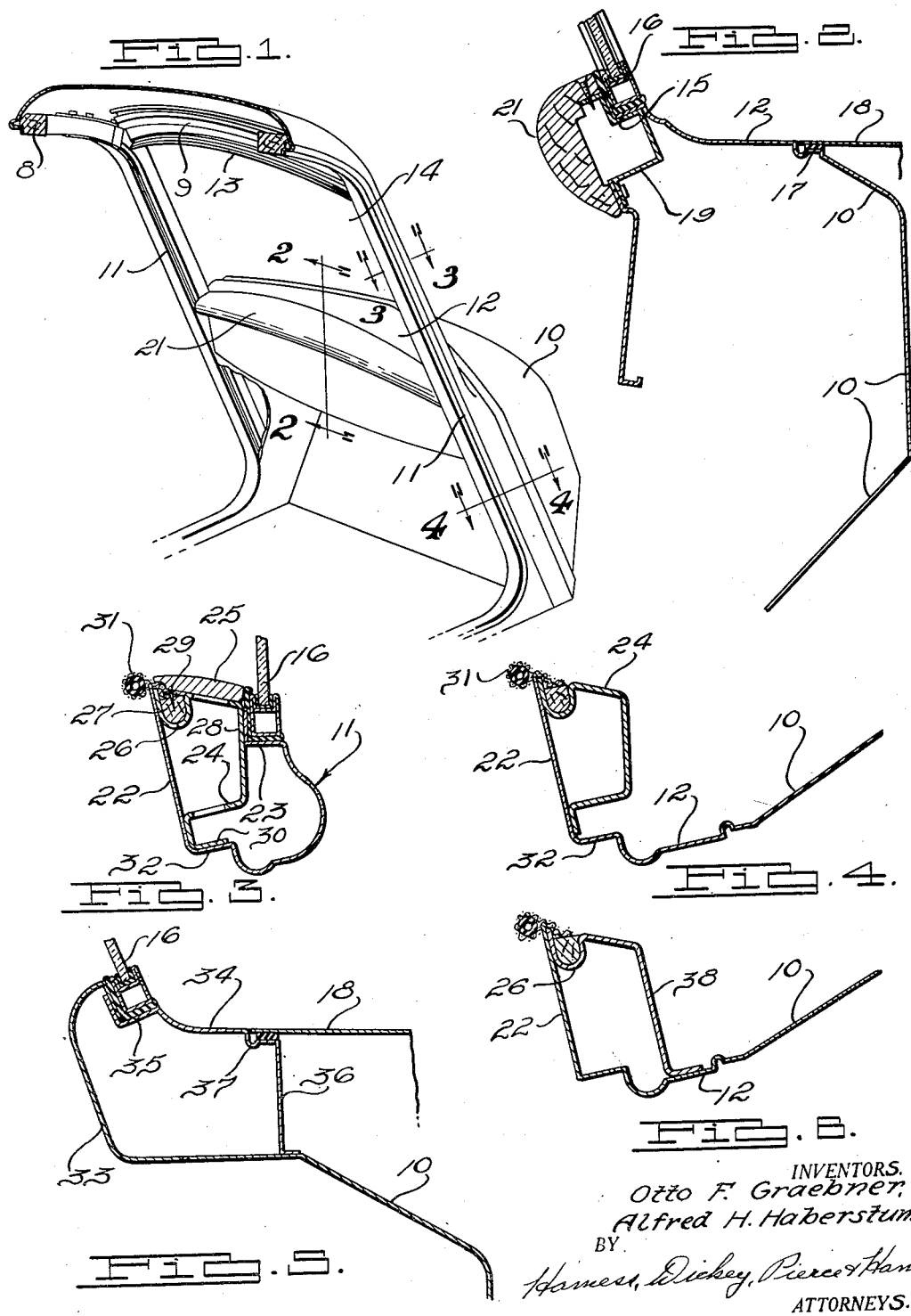

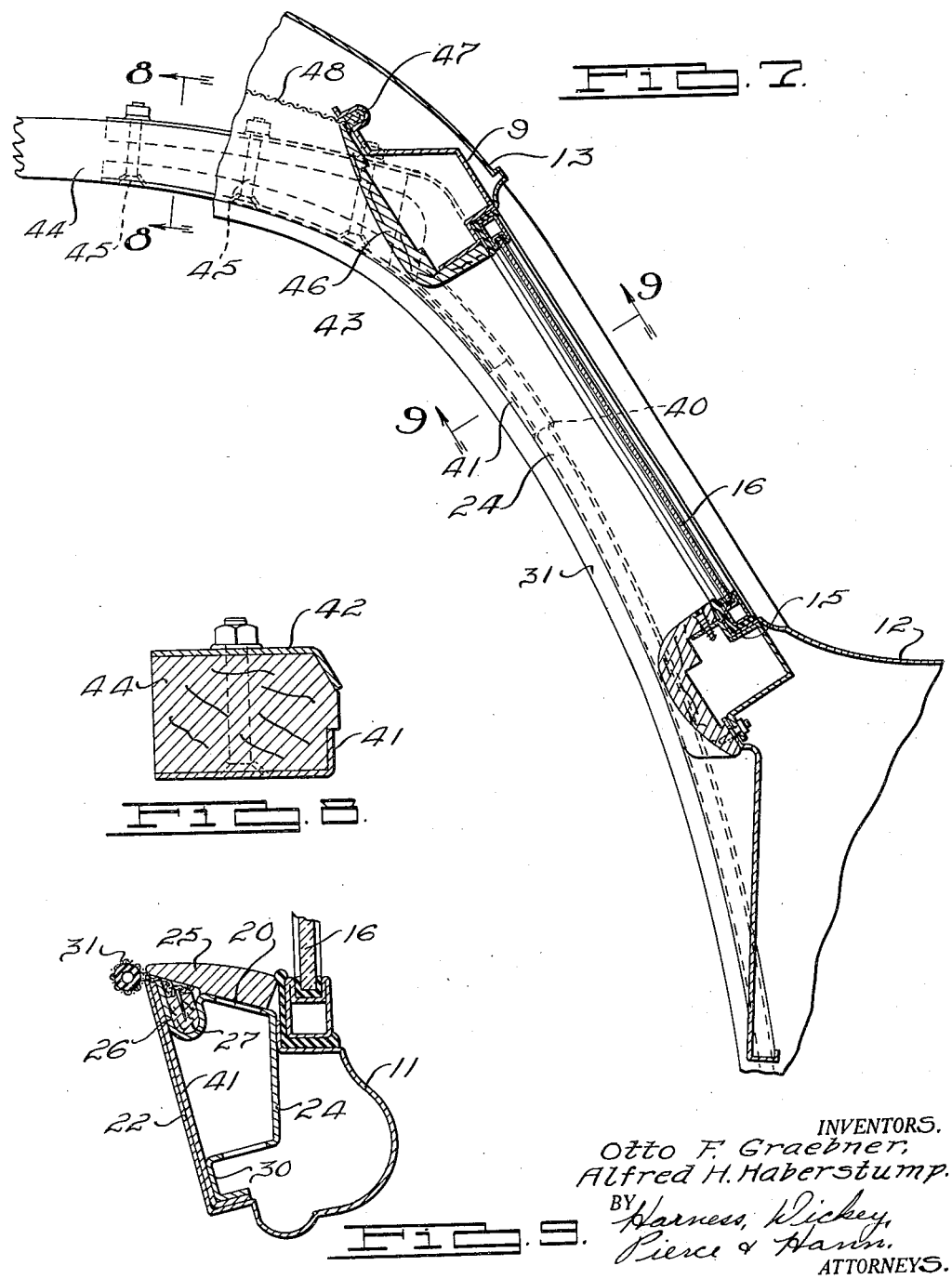

2,075,936

UNITED STATES PATENT OFFICE 2,075,936

VEHICLE BODY

Otto F. Graebner and Alfred H. Haberstump, Detroit, Mich., assignors to The Murray Corporation of America, a corporation of Delaware Application December 23, 1933, Serial No. 703,800

10 Claims. (Cl. 296—28)

Our invention relates to vehicle bodies and particularly to the front unit stamping of the body and to the pillar construction.

The front portion of the vehicle body has usually been made of several stampings, the cowl and dash portions being independent of the pillar and header portions. In view of the change of body design to provide a material slope to the front end of the vehicle to provide a streamlined effect thereto, we are able to form the front panel as a unit stamping embodying the pillars, header, cowl and dash portions of the vehicle body.

In practicing our invention, we employ a unit sheet of material and construct stamping dies in such manner as to preform from the unit sheet the dash, the dash panel, the pillars and header elements of the vehicle and embodying the window receiving rabbet and front door jambs for the front doors of the vehicle. A short cowl may be formed frontwardly of the pillars along with the dash, and the dash panel may be formed as a separate unit and disposed between the pillars below the window opening. Pillar reinforcing elements are employed the length of the stamping to materially reinforce the pillar portion thereof.

Accordingly, the main objects of our invention are to provide a front portion of a vehicle as a unit stamping; to stamp from a unit sheet of material the dash, the dash panel, the pillars and the header of a vehicle body; to preform a sheet of material in such manner as to provide the front pillars, header, cowl and dash of the vehicle body including the front door jambs and the rabbet for receiving the windshield in the windshield opening of the stamping; to provide reinforcing pillar elements; and, in general, to materially improve the construction of the vehicle body by forming the front portion thereof from a single sheet of material which simplifies the construction, enhances the appearance and materially strengthens the resulting vehicle body.

Other objects and features of novelty of our invention will be either specifically pointed out or will become apparent when referring, for a better understanding of our invention, to the following description taken in conjunction with the accompanying drawings, wherein:

Figure 1 is a perspective view of a front end of a vehicle body embodying features of our invention.

Fig. 2 is an enlarged sectional view of the structure illustrated in Fig. 1, taken on the line 2—2 thereof.

Fig. 3 is an enlarged sectional view of the structure illustrated in Fig. 1, taken on the line 3—3 thereof.

Fig. 4 is an enlarged sectional view of the structure illustrated in Fig. 1, taken on the line 4—4 thereof.

Fig. 5 is a sectional view of structure, similar to that illustrated in Fig. 2, showing the modified form of our device.

Fig. 6 is a view of structure similar to that illustrated in Fig. 4, showing a modified form thereof.

Fig. 7 is an enlarged broken view of the pillar and header portion of the structure illustrated in Fig. 1.

Fig. 8 is an enlarged sectional view of the structure illustrated in Fig. 7, taken on the line 8—8 thereof, and Fig. 9 is an enlarged sectional view of the structure illustrated in Fig. 7, taken on the line 9—9 thereof.

In Fig. 1, we have illustrated a front portion of a vehicle body which is constructed from a unit stamping. The stamping comprises a dash 10, side pillars 11, a cowl 12 and a header 13, the cowl, header and pillars forming a windshield opening 14. In Fig. 2, we have illustrated the cowl portion 12 as being rabbeted at its upper end, at 15, for receiving a windshield 16 and being preformed at the junction between the dash 10 and the cowl 12 to form a support 17 for a hood 18. A reinforcing cross brace 19 is welded or otherwise secured to the rabbet portion 15 of the cowl 12, extending across the body to engage the pillars and at the same time forming a support for the finish panel 21. An instrument panel 20 is supported on the lower edge of the cross brace 19.

The pillars 11 join the top rails 8 and are formed, as illustrated in Figs. 3 and 4, to provide door jambs 22 for the front edge of the vehicle door. The edge at the window opening is preformed at 23 to provide a rabbet for receiving the windshield 16. The rabbet 23 is preferably continuous with the rabbet 15 of the cowl 12 and with a similar rabbet provided in the header panel portion 13 to which a header 9 is secured.

A reinforcing element 24 is disposed within the reversely bent portion of the pillar, as illustrated in Fig. 3. The element 24 at the windshield opening is engaged by one of the flanges of the rabbet 23 and the inner end of the door jamb 22 of the pillar paneling. The element is welded or otherwise secured to the pillar and braces and strengthens the pillars and provides a support for the inner finish molding 25 which is disposed about the windshield opening.

The element 24 is provided with a channel shaped portion 26 in which a tack receiving element 27, which may be made of wood, paper, fiber or other material, is disposed for retaining tacks 29 therein which secure a finish element 31 along the door edge. As illustrated in Fig. 4, the reinforcing element 24 extends downwardly along the entire length of the pillar and below the window opening and is secured to the door jamb portion 22 of the paneling at the front and rear edge thereof in the same manner as illustrated in Fig. 3. Material support is added to the pillar portion of the paneling by the element 24 and at the same time a box section structure is formed which adds material strength thereto.

The pillar reinforcing element 24, as illustrated in Figs. 3 and 4, is of triple channel section at the window opening, having a main channel central portion 28 with a channel section 26 and 30 at the ends. The channel 26 is employed for retaining a tacking material while the channel 30 forms a solid corner with the paneling of the body and permits the inner welding of the element 24 through the openings 20.

We have illustrated in Fig. 6 a further extension of the invention wherein a Z section reinforcing element 38 having a channel tacking section 26 is joined to the inner end of the door jamb portion 22 of the paneling and to the cowl side 12. While this construction forms a box sectioned pillar element, it does not provide the strength at the corner of the paneling, directly adjacent to the corner opening of the door, at the rabbet 32 thereof. We, therefore, preferably employ the reinforcing element 24, as illustrated in Figs. 2 and 4, to strengthen the rabbet 32 at the door opening and to form in addition, a box section construction with the jamb face 22 of the paneling below the window opening and a double box section at the window opening.

As a further extension of our invention, we have illustrated in Fig. 5 a modified form of the unit stamping wherein an instrument panel 33 is formed directly in the stamping and is extended to form the dash 10. A cowl panel 34 may be disposed above the dash 10, forwardly of the dash panel 33, having a rabbet 35 therein for receiving the frame of the windshield 16. The paneling 34 is flanged downwardly at 36 to join the dash 10 to provide strength to the cowling and the dash and forming a box section structure forwardly of the windshield opening which may take place of the brace 19, illustrated in Fig. 2. The corner between the cowl 34 and the flange 36 is preformed at 37 to provide a ledge for receiving the hood 18.

In either construction the formation of the dash, dash panel or cowl, the header, and the pillars which go to form the front portion of the vehicle body is entirely stamped from a unit sheet of material which not only reduces the cost of forming the front portion of a vehicle but materially strengthens the vehicle. Especially is this true in view of the side pillars 11 which are of triple channel section at the windshield opening and brace the corner portions of the pillar and the finished panel portion of the stamping. The shaping, welding and handling of separate elements, employed heretofore in the art, is thereby eliminated and a material saving in labor, material and cost results.

In Fig. 7, we have shown an enlarged view of the pillar construction at the window opening wherein the reinforcing element 24 has the channel portions 30 and 26 offset inwardly at 40 to form a shoulder to receive a flanged plate 41 secured thereto by welding to form a double extension with the web 42 of the channel portion 28. The plate 41 is extended from 43 the terminal end of the channel portions 26 and 30 parallel to the extending web 42 to engage opposite sides of a top rail 44 which is retained in fixed relation to the pillar by a plurality of bolts 45, as illustrated in Fig. 8.

The header 9 extends between the pillar reinforcing elements 24 at this point and is joined to the header portion 13 of the stamping to form a box section construction wherein a windshield wiper motor (not shown) is disposed. An inner finish panel 46 is secured over the header and a tacking strip receiving channel 47 is formed in the upper edge of the header 9 to which the top finish trim material 48 is secured by tacks. It is to be understood that when a metal roof rail is employed the pillar reinforcing element 24 is extended in a somewhat similar manner to engage and be welded, bolted or otherwise secured thereto to form a continuous frame structure for the vehicle body.

In Fig. 9 I have shown a section through the pillar at the junction between the plate 41 and the web 42 wherein the channel portions 30 and 26 are offset to receive the plate 41 to form a continuous surface. The pillar reinforcing element 24 is secured thereto in unit engagement and to the pillar panel 11 through the welding of the inner flange edges through the openings 20 as above described.

In view of the frontward slope to the header, the pillar, the cowl and dash, all of the elements are formed from a unit stamping which eliminates the fabricating of the front panel portion of the vehicle as has occurred heretofore. Material strength is provided to the structure by a pillar reinforcing element which is of triple channel section at the windshield opening and which forms a double box section structure with the pillar paneling at this point. Connection is made by the pillars to the top rail through the main flange of the reinforcing element having a plate disposed parallel to the projecting web of the main reinforcing element between which engagement is made to the rail. The front end of the vehicle body is materially simplified when formed as hereinabove described and a material saving in labor and material and increased strength is provided by the construction.

While we have described and illustrated but two embodiments of our invention, it will be apparent to those skilled in the art that various changes, omissions, additions and substitutions may be made therein without departing from the spirit and scope of our invention, as set forth in the accompanying claims.

We claim as our invention:

1. A vehicle body having the front end thereof constructed from a unit stamping including a pressed-in instrument panel, a pressed-out dash portion, preformed side pillar elements forming the jamb faces of the door, a cross header member joining said pillar members and forming therewith a windshield opening, and a cowl panel supported by said instrument panel and dash and provided with a rabbet for receiving the lower portion of a windshield.

2. A vehicle body having side pillar elements pressed out of sheet paneling forming a jamb face for a door, a reinforcing pillar element therefor of at least double channel section mated with the jamb face of the paneling forming a box section structure therewith.

3. A vehicle body having the paneling thereof extending inwardly and forming the jamb face for a door, a pillar reinforcing member of double channel section secured adjacent to said jamb portion forming a box section therewith, the second channel portion having a web and side joined to said jamb portion and the side surface of the paneling to strengthen the corner thereof.

4. In a vehicle body, a front end portion therefor made as a unit stamping including a cowl, a dash, side pillars embodying the front door jambs, a header forming with the pillars and cowl a windshield opening the marginal edges of which are flanged to provide a rabbet, and reinforcing pillar elements of at least double channel section engaging the pillar portions and having one portion forming a box section with the door jambs and another portion nested in the corners between the jambs and pillar sides.

5. In a vehicle body, a front end portion therefor made as a unit stamping including a cowl, a dash, side pillars embodying the front door jamb, a header forming with the pillars and cowl a windshield opening the marginal edges of which are flanged to provide a rabbet, and reinforcing pillar elements of double channel section secured to the pillars along the door jamb portions forming box sections therewith and portions outwardly presented having the side and web portion nested in the corner junctions between the jamb faces and the sides of the stamping.

6. In a vehicle body, a front end portion therefor made as a unit stamping including a cowl, a dash, side pillars embodying the front door jambs, a header forming with the pillars and cowl a windshield opening the marginal edges of which are flanged to provide a rabbet, and reinforcing pillar portions of triple channel section one channel forming a receiving element for a tacking strip and secured to the pillar portions against the door jambs thereof forming a box section with a central channel and having the web and side of another channel strengthening the corners between the door jambs and the sides of the stamping.

7. In a vehicle body construction, a side panel bent inwardly forming the jamb face of the door at the door opening, a reinforcing pillar extending the length of the jamb face and mated therewith to form a box section structure with a portion thereof and having a web and flange of another portion mated with the corner at the junction between the jamb face of the panel to provide strength to the corner.

8. In a vehicle body, a side panel extended inwardly to form a jamb face for a door, of a reinforcing element therefor of triple channel section, one channel receiving a tacking strip, the element being secured to the jamb face to have a portion thereof form a box section structure therewith while an additional flange and web mates with the corner junction between the panel side and the jamb face to directly brace the corner.

9. In a vehicle body, a reinforcing pillar element of channel section, an extending plate secured to offset portions of the flanges of the channel section to form with the main web of the channel section spaced securing means.

10. A reinforcing element for a pillar of a vehicle body of channel section having a web and extending flanges, a projecting plate secured to offset portions of the flanges at their outer extremity and projected to extend in parallel relation to the web of said reinforcing element, and a top rail element engaged by said spaced web and plate for securing the reinforcing element to said rail.

OTTO F. GRAEBNER.
ALFRED H. HABERSTUMP.